US009197569B2

(12) United States Patent
Li

(10) Patent No.: US 9,197,569 B2
(45) Date of Patent: Nov. 24, 2015

(54) HIERARCHICAL CONTROL IN SOFTWARE-DEFINED NETWORK (SDN)

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 186 days.

(21) Appl. No.: 14/099,622

(22) Filed: Dec. 6, 2013

(65) Prior Publication Data

US 2015/0163151 A1    Jun. 11, 2015

(51) Int. Cl.
*H04L 12/28* (2006.01)
*H04L 12/851* (2013.01)
*H04L 12/759* (2013.01)
*H04L 12/24* (2006.01)

(52) U.S. Cl.
CPC .......... *H04L 47/2441* (2013.01); *H04L 41/044* (2013.01); *H04L 41/12* (2013.01); *H04L 45/028* (2013.01)

(58) Field of Classification Search
CPC .... H04L 47/2441; H04L 45/028; H04L 41/20
USPC .................. 370/389–392, 400–422
See application file for complete search history.

(56) References Cited

U.S. PATENT DOCUMENTS

2013/0044636 A1* 2/2013 Koponen et al. ............... 370/254
2014/0317256 A1* 10/2014 Jiang et al. .................... 709/223

* cited by examiner

*Primary Examiner* — Ricky Ngo
*Assistant Examiner* — Wei-Po Kao

(57) ABSTRACT

System and method of providing SDN network service management by use of a distributed control system that comprises a hierarchy of controllers. The distributed control system includes regional controllers and one or more root controllers. A respective regional controller is configured to control a set of network devices and maintain regional network map related thereto. A respective root controller is configured to control a group of regional controllers and maintain a global network map across regions of the SDN. The root controllers can synchronize the global network map with each other and its subordinate controllers. A root controller may not be activated for packet transmission route determination unless its subordinate regional controller is unequipped with sufficient information to determine a requested route.

18 Claims, 3 Drawing Sheets

HIERARCHICAL CONTROL IN SOFTWARE-DEFINED NETWORK (SDN)

TECHNICAL FIELD

The present disclosure relates generally to the field of communication network, and, more specifically, to the field of software defined networks (SDN).

BACKGROUND

In a software-defined network (SDN) architecture, the control plane that implements important network routing and switching functionalities and the data forwarding plane are decoupled. The control plane can be logically centralized and implemented with a variety of hardware components of varied architectures. The data plane may utilize inexpensive and simplified network switches or routers configurable by a SDN controller as a result. The SDN paradigm has increasingly gained popularity in both research and commercial environments due to its scalability, cost-efficiency, reliability, and flexibility in customizing and optimizing network services to specific user needs.

An SDN enables an Information Technology (IT) organization to move to a scale-out model of networking whereby network functionality can be added when needed, and the SDN controller enables the organization to manage all the networking functionalities in a centralized manner. However, the conventional centralized control methodology in an SDN also suffers from the limitation of the number of network devices, e.g., switches or routers, that a central controller can support, which unfortunately limits the scalability and expandability of the SDNs. Therefore, the applications of the SDNs are undesirably limited to relatively small scale networks. Conventionally, in a wide area network (WAN), the SD controllers of different subnetworks are linked and communicate to each other by relying on hardware facilities. Thus, it is difficult to manage the whole WAN comprehensively in software.

One standard for flow processing in an SDN is OpenFlow, which defines the protocol used to transport messages between the control plane and the forwarding plane and describes a model for packet processing. For instance, when a packet arrives at an OpenFlow switch, the header fields are compared to flow table entries. If a match is found, the packet is processed according to the corresponding actions specified in the flow table, e.g., forwarded to a specified port or dropped. When an OpenFlow switch receives a packet that does not match any entry in the flow table, it encapsulates the packet and sends it to the controller. The controller then decides how the packet should be handled and notifies the switch to drop the packet or to make a new entry in the flow table to support the new flow.

Traditional SDN system typically maintains a predefined network map. If a packet need to be sent to a network node that is not included in the predefined network map, a router or virtual router send a request to the controller which can update the network map in response. To reduce latency, the network map needs to be updated rapidly, e.g., in the order of milliseconds, which unfortunately is difficult to achieve. Thus, the conventional SDN network is typically sensitive to latency.

SUMMARY OF THE INVENTION

Therefore, it would be advantageous to provide a software-defined network (SDN) control mechanism that offers augmented scalability and high latency tolerance to an SDN. Accordingly, embodiments of the present disclosure employ a distributed control system to control the network devices in a SDN and thereby manage the network services of a SDN. The distributed control system comprises a hierarchy of controllers including regional controllers and one or more root controllers. A respective regional controller is configured to control a set of network devices and maintain regional network map related thereto. A respective regional controller may comprise multi-tier and can directly control virtual routers in accordance with the OpenFlow protocol. A respective root controller is configured to control a group of regional controllers and maintain a global network map across regions of the SDN. The root controllers can synchronize the global network map with each other and its subordinate controllers. A root controller may not be activated for packet transmission route determination unless its subordinate regional controller is unequipped with sufficient information to determine a requested route.

In one embodiment of the present disclosure, a hierarchical control system configured to provide network management for a software-defined network (SDN) comprises: (1) a regional controller configured to control a respective set of network devices and maintain a regional network map thereof, wherein the SDN comprises a plurality of regions, wherein a respective region comprises the regional controller and the respective set of network devices; and (2) one or more root controllers, wherein a respective root controller is configured to: maintain a global network map across regions of the SDN; communicate the global network map with the regional controller; synchronize the global network map with another root controller.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
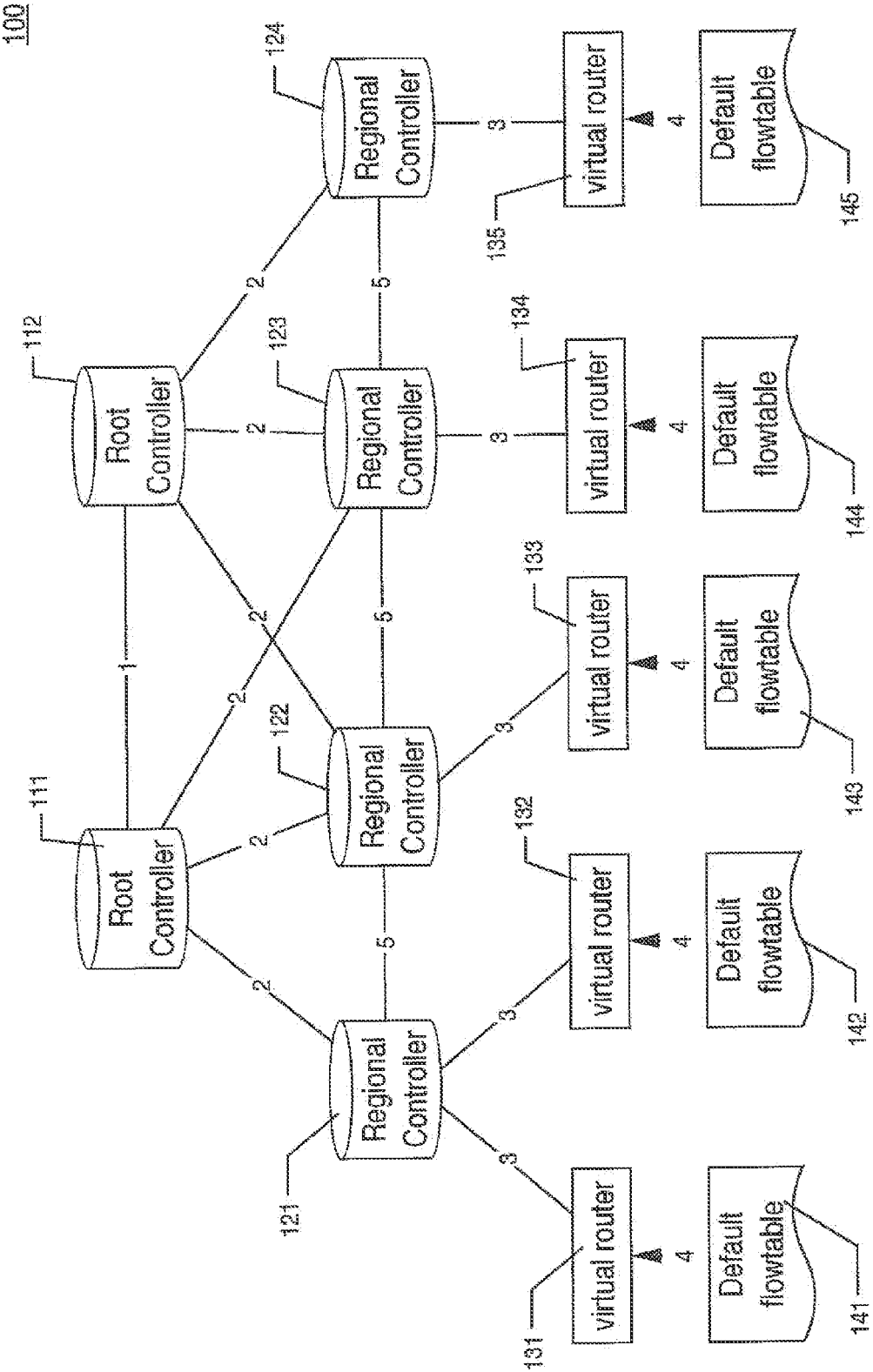
FIG. 1 is a block diagram illustrating an exemplary architecture of a distributed SDN control system in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Hierarchical Control in Software-Defined Network (SDN)

Embodiments of the present disclosure employ a distributed control system that comprises a hierarchy of controllers to control network devices and thereby manage network services of a software-defined network (SDN). The hierarchy of controllers including regional controllers in a lower level and root controllers in an upper level. A respective regional controller can be configured to control one or more network devices and maintain a regional network map including the regional network topology, related to the network region that the regional controller manages. A regional controller may have multi-tier and can directly control network devices in the network region, e.g., through virtual routers. A respective root controller can be configured to control a subnetwork which includes a group of regional controllers, or the subordinate controller of the root controller, and the associated network devices.

A root controller may maintain a global network map including intra-region network information of the SDN, and synchronize the global network map with other peer root controllers. A root controller may update the global network map by acquiring route information related to the subnetwork that it manages from its subordinate controllers. The root controller may also acquire information related to other subnetworks from its peer root controllers.

If a lower level controller, e.g., a regional controller, has insufficient route information to determine a route for a packet, an upper level controller, e.g., a root controller, may determine a packet transmission route by using a broader network map contained therein and push relevant route information to the lower level controller. The route information is then used to update the flow table for forwarding the packet. Through a logically distributed control system according to the present disclosure, an SDN can be advantageously expanded to any scale, and possibly spans the entire global network. The distributed control system may be configured as a hierarchical control system, FIG. 1 is a block diagram illustrating an exemplary architecture of a distributed SDN control system 100 in accordance with an embodiment of the present disclosure. In this example, the control system includes a top level having a plurality of root controllers, e.g., 111 and 112, and a bottom level having a plurality of regional controllers, e.g., 121-124. Each regional controller can control one or more virtual routers, e.g., 131-135. Each virtual routers act as an abstract representation of multiple physical devices, e.g., the master and backup routers.

As illustrated, each of the root controllers 111 and 112 maintains a global network map of the SDN, or a network map of a SDN subnetwork that the root controller manages. The SDN subnetwork corresponds to a domain of the SDN in some embodiments. As represented by the line with the label "1," the root controllers 111 and 112 in a distributed SDN control system are capable of communicating with each other and synchronizing with each other the information included in their respective global network maps, especially the route information outside their respective subnetwork.

As represented by lines with the label "2," the root controllers 111 and 112 are also capable of synchronizing the route information with the regional controllers 121-124. For example, the root controller can collect updated network information from the regional controllers and share relevant information from the global network map with the regional controllers.

As represented by lines with the label "3," the regional controllers 121-124 can directly control the virtual routers, e.g., 131-135, and program corresponding flow tables for the virtual routers. In some embodiments, the regional controller 121-124 can communicate with the virtual routers in accordance with the OpenFlow protocol and standard. The regional controllers 121-124 can also communicate with each other, for example with respect to performances of respective network region, as marked by lines "5."

A regional controller can be employed to determine a route by use of the regional network map and modify the default flow table accordingly. Further, if the regional network map still lacks sufficient information to determine the requested route because the destination node is located in another region of the network, a root controller can be employed to determine a requested route by use of the global network map. Subsequently the corresponding regional controller can modify the default flow table based on the route determined by the root controller. As the time consumed by a controller for rout determination depends on the amount of information utilized for the determination, e.g., the information contained in its network map, the hierarchical control system can significantly reduces the need for complicated route determination process, and thereby reduces the network latency.

In some embodiments, each virtual router, e.g., 131 or 132, is assigned with a predefined default flow table, e.g., 141, 142, 143, 144, or 145, initially, which encompasses only simple entries for instance. For instance, upon receiving a packet, a virtual router makes an attempt to determine a transmission route based on the default flow table. If the default flow table lacks an entry to determine a requested route, the virtual router send the packet to the physical network, and at the same time send a route discovery request to a corresponding regional controller.

The present disclosure is not limited to any specific number of subordinate controllers that are controlled by a superordinate controller. A subordinate level controller can also be controlled by two immediate superordinate level controllers. For example the regional controller 122 is controlled by both root controllers 111 and 112.

The present disclosure is not limited to any specific type of information included in a network map. A network map maintained by the controllers logically represents the associated network devices and connecting trunk topology of the associated network region. In some embodiments, a network map can also record the status of each device and trunk of the network region. A global network map may be updated with reachability update, flow setup/tear-down/update request, and capability update. For example, the flow setup/tear-down/update request includes application capability requirements such as quality of service (QoS), data rate, and latency, etc. The capability update includes network related capabilities such as data rate and QoS. The capability update includes network related capabilities such as a data rate and QoS, and system and software capabilities available inside a domain.

It will be appreciated by those skilled in the art that a network map can be used in the controller in any suitable fashion e.g., as dictated by specific SDN services. For example, the global network map may encompass information for identifying the specific devices in the network so that when a route is created, it can be dissected into an ordered list of devices. Based on the ordered list of devices, a data packet can be transmitted through the network.

Although FIG. 1 illustrates two levels of controller only, it will be appreciated by those skilled in the art that the present disclosure is not limited to any specific number of control levels in the distribute control system. Each regional controller shown in FIG. 1 may comprise a multi-tier hierarchy of intermediate controllers, whereby a respective intermediate controller maintains a network map corresponding to a SDN region that it manages. The respective intermediate controller can synchronize the network map with its superordinate controllers or subordinate controllers. In some embodiments, an intermediate controller synchronizes its entire network map with its superordinate controller, for example periodically. In some embodiments, an intermediate controller synchronizes a portion of the network map with its subordinate controller in response to the subordinate controller's request.

An intermediate regional controller in a respective level, or tier, can exchange and synchronize route information with a subordinate controller in a lower tier. For instance, if a lower-tier intermediate controller is not equipped with sufficient information to determine a requested route, a corresponding upper-tier intermediate regional controller can be employed to determine a requested route based on its broader network map and provide this route information to the lower tier controller, e.g., through a push function. Otherwise, the corresponding upper-tier intermediate controller can continue to relay the request upward to an intermediate controller of a higher tier.

In some embodiments, a regional controller along with the associated virtual routers and the network equipments controlled thereby corresponds to a regional network, such as an Information Technology organization, a data center, a cloud, etc. Therefore, a hierarchical control system according to the present disclosure can be used to intelligently and comprehensively control and manages resources of a wide area network (WAN) including multiple subnetworks, e.g., one or more personal area networks (PANs), local area networks (LANs), campus networks (CANs), and metropolitan area networks (MANs).

It will be appreciated by those skilled in the art that the constituent controllers in a distributed control system according to the present disclosure may communicate with each other and with the virtual routers according to any suitable method or protocol. In some embodiments, the controllers may be based on OpenFlow standard and communicate with the virtual router via the OpenFlow protocol.

As will be appreciated by those skilled in the art, the constituent controllers in the distributed control system may be configured to perform various additional network functions that are well known in the art, including the ability to discovery devices, adopt devices, coordinate flow setup originated by applications, and create a network topology. The applications may contain information such as path requirement, quality of service (QoS), and service-level agreement.

Different components in the distributed control system as illustrated in FIG. 1 may be implemented as software programs, hardware logic, or a combination thereof. Further, although logically distributed, the components in one distributed control system may be implemented in a physically centralized or distributed manner, e.g., on one single console or geographically separated consoles.

The virtual routers may be implemented in any suitable method that is well known in the art. Each virtual router may represent an abstract representation of multiple physical routers, i.e. master and backup routers, acting as a group. For example, the default gateway of a participating host can be assigned to the virtual router instead of a physical router. If the physical router that is routing packets on behalf of the virtual router fails, another physical router is selected to automatically replace it. The physical router that is forwarding packets at any given time is called the master router. However, in some other embodiments, a regional controller can control physical network devices without the presence of virtual routers.

Figure 2:
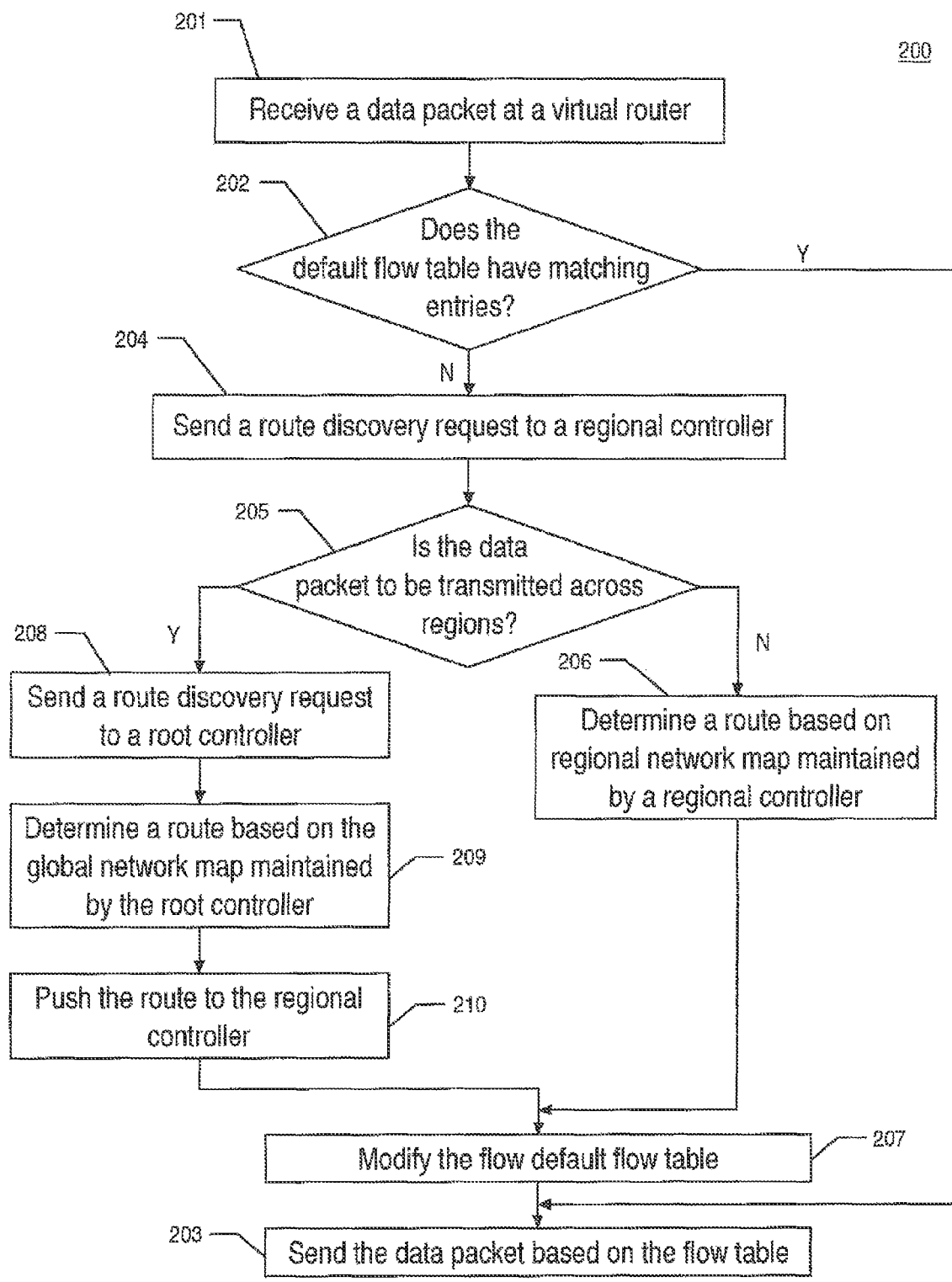
FIG. 2 is a flow chart depicting an exemplary method of determining a packet transmission path through a distributed control system in accordance with an embodiment of the present disclosure.

FIG. 2 is a flow chart depicting an exemplary method of determining a packet transmission path through a distributed control system in accordance with an embodiment of the present disclosure. At 201, a data packet is received at a virtual router. In this embodiment, the virtual router is provided with a predetermined flow table by default. If the virtual router can match the packet with the entries in the default flow table as determined at 202, the data packet is forwarded to a destination network device based on the default entries at 203.

If there is no matching entry in the default flow table, the virtual router can send a route discovery request to a regional controller that controls the virtual router at 204. If the regional controller determines that the destination node is located within the region that the regional controller manages at 205, the regional controller can then determine a route based on the regional network map maintained therein at 206. The regional controller can make the determination by examining the regional network map for example. The regional controller then modifies the default flow table based on the route discovery at 207. The virtual router then sends the packet based on the modified flow table at 203.

On the other hand, if the destination node is outside the region controlled by the regional controller as determined at 205, the regional controller relays the route discovery request to an upper level controller at 208, which is the root controller in this embodiment. In response to the relayed request, the root controller determines a route based on the global network map contained therein at 209 and communicates the route information with the regional controller at 210. The regional controller then accordingly modifies the flow table at 207 to include the new entry which is then used to forward the packet at 203 by the virtual controller. However, in some other embodiments, the root controller may be capable of modifying the flow tables directly.

Figure 3:
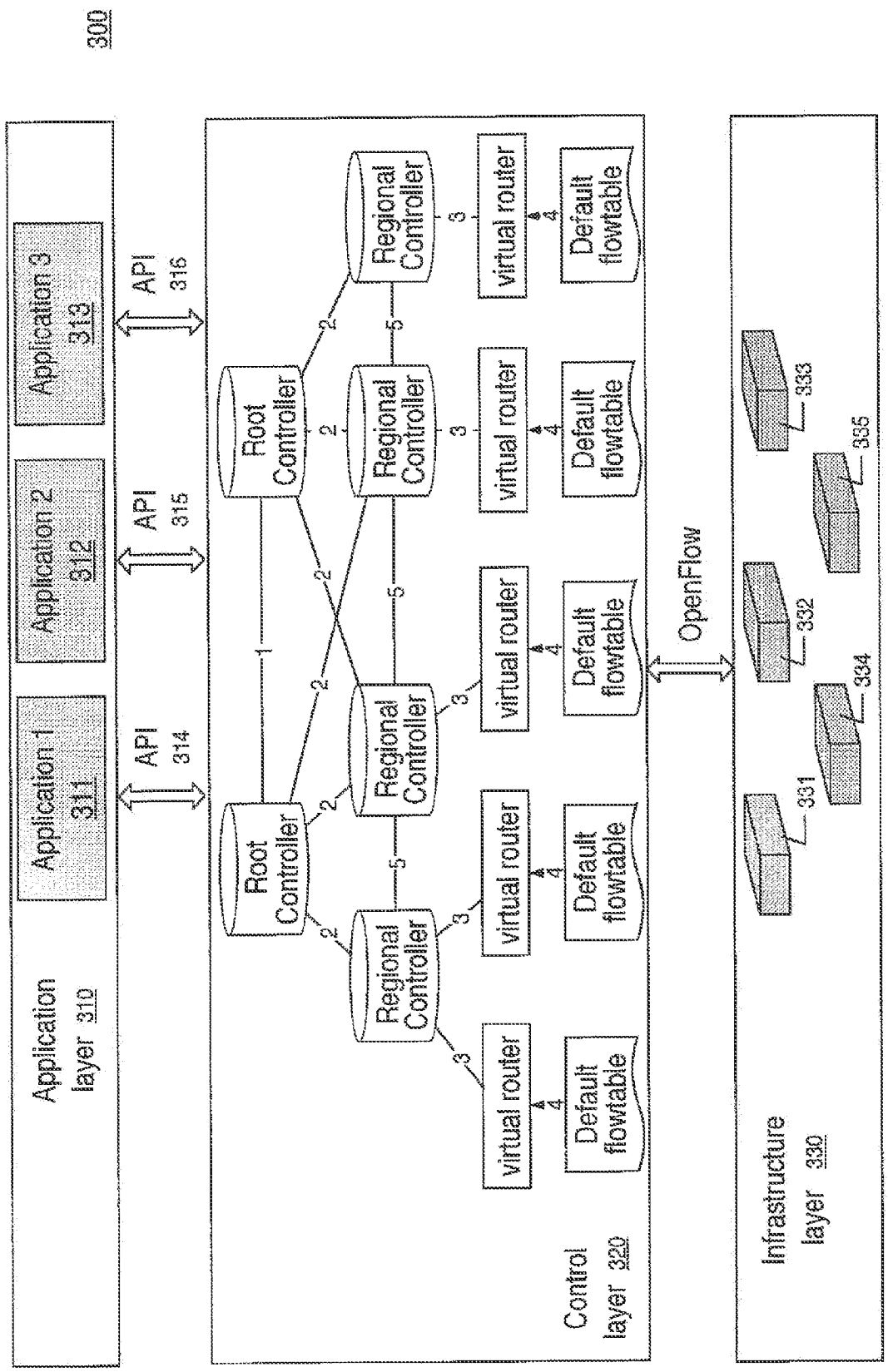
FIG. 3 is a block diagram illustrating an exemplary architecture of an SDN that employs a distributed control system in accordance with an embodiment of the present disclosure

FIG. 3 is a block diagram illustrating an exemplary architecture of an SDN 300 equipped with a distributed control system in the control plane in accordance with an embodiment of the present disclosure. The SDN 300 includes three logic layers, the application layer 310, the control layer 320, and the infrastructure layer 330. The control layer 320 serves as the interface between the application layer 310 and the infrastructure layer 330.

The infrastructure layer 330 includes the network hardware devices 331-335 coupled in the network, e.g., SDN switches or SDN routers. The control layer 320, or the SDN controller, can offer proprietary programming interfaces to network devices and management. The control layer 320 may include one or more control software programs, e.g., 321-323. One controller program 321, when executed by a processing unit, can perform respective controller function as discussed with reference to FIG. 1 and FIG. 2. The control layer 320 communicates with the network devices in the OpenFlow protocol.

In some embodiments, each controller in the distributed control system includes an input interface, a route computation module, a message generation module, an output interface, a storage module and a network circuit. The input interface operates to receive route requests from a network device or other controllers within the network. The route computation module is configured to determine transmission paths, e.g., based on topology information of the network, in accordance with any suitable algorithm or routing model. The message generation module can generate a route response that identifies the computed route in accordance with any suitable format recognizable by the pertinent network devices. The output interface is configured to send the route response to a network device or other controllers. The storage module may store the topology information of the network that can be used for route computation. The network circuit can render network connection between the controller and the network devices in the network.

The application layer 310 includes application programs 311-313 and can deliver network functions or services in software on a virtual machine or only create an overlay network. For example, the application programs 311-313 can be related to cloud, load balancing, business applications, network security, burst transmission, to name a few. The application layer 310 communicates with the control layer application program interfaces 314-316 corresponding to respective application programs 311-313.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A hierarchical control system configured to provide network management for a software-defined network (SDN) comprising:
    a regional controller configured to control a respective set of network devices and maintain a regional network map thereof, wherein said SDN comprises a plurality of regions, wherein a respective region comprises said regional controller and said respective set of network devices; and
    one or more root controllers, wherein a respective root controller is configured to:
        maintain a global network map across regions of said SDN;
        communicate said global network map with said regional controller;
        synchronize said global network map with another root controller,
    wherein said respective root controller controls a group of regional controllers that includes said regional controller, and wherein said regional controller comprises a hierarchy of controllers,
    wherein an upper level controller in said hierarchy is configured to:
        control a respective number of subordinate level controllers in said hierarchy; and
        communicate with said respective number of subordinate level controllers with respect to network map corresponding to said set of network devices associated with said respective number of subordinate level controllers,
    wherein said respective root controller is configured to synchronize global network map with said regional controller based on time-to-live information (TTL),
    wherein said regional controller is configured to program a flow table based on synchronized global network map, and
    wherein further said regional controller is configured to communicate with another regional controller of said group with respect to performance information related to said set of network devices and program flow tables based on said performance information.

2. The hierarchical control system of claim 1 further comprising virtual routers coupled between said set of network devices and said regional controller, wherein a respective virtual router comprises a default flow table that is programmable by a bottom level controller of said hierarchy of controllers.

3. The hierarchical control system of claim 2, wherein said regional controller is configured to communicate with said virtual routers in compliance with an OpenFlow protocol.

4. The hierarchical control system of claim 1, wherein said respective region corresponds to an Internet Data Center (IDC), and wherein said SDN comprises a wide area network (WAN).

5. The hierarchical control system of claim 1, wherein said group of regional controllers and said one or more root controllers are implemented as software programs.

6. The hierarchical control system of claim 1, wherein said network service management comprise network resource management for said SDN.

7. A computer implemented method for managing network devices of a communication network, said method comprising:
    receiving a route discovery request for transmitting a data packet from a source node to a destination node within a communication network, wherein said communication network comprises a plurality of regional networks comprising regional controllers and network nodes controlled by said regional controllers;

maintaining regional route information of said plurality of regional networks;

controlling a group of said regional controllers;

maintaining global route information of said communication network;

programming a flow table based on regional route information by use of a corresponding regional controller if said source node and said destination node are within a regional network;

receiving global route information sent from a corresponding root controller to said corresponding regional controller if said source node and said destination node are in different regional networks; and programming the flow table based on received global route information by use of said corresponding regional controller.

8. The method of claim 7, wherein said network nodes comprise virtual network elements, and further comprising:

providing a default flow table to a virtual network element;

modifying a default flow table based on regional route information; and forwarding said data packet based on modified flow table.

9. The method of claim 8 further comprising synchronizing global route information between root controllers.

10. The method of claim 8, wherein said corresponding regional controller comprises a hierarchy of controllers, wherein each superordinate level controller in said hierarchy is configured to control a number of subordinate level controllers in said hierarch, and further comprising synchronizing route information between a superordinate level controller and a subordinate level controller.

11. The method of claim 8 further comprising detecting performance of said regional network at said corresponding regional controller based on time-to-live information, and communicating detected performance information with another regional controller.

12. The method of claim 8, wherein said plurality of regional networks corresponds to a plurality of Information Technology organizations, and wherein further said communication network comprises a wide area network (WAN).

13. The method of claim 7 further comprising:

receiving said data packet at a virtual network element;

if a corresponding default flow table associated with said virtual network element comprises sufficient route information for said data packet, forwarding said data packet based on said corresponding default flow table; and if said corresponding default flow table comprises insufficient route information for said data packet, sending said routing discovery request to a regional controller that controls said virtual network element.

14. A non-transitory computer-readable storage medium embodying instructions that, when executed by a processing device, cause the processing device to perform a method of managing network services for a software defined network (SDN), said method comprising:

receiving a route discovery request for transmitting a data packet from a source node to a destination node within said SDN, wherein said SDN comprises a plurality of regional networks comprising regional controllers and network nodes controlled by said regional controllers;

maintaining regional route information of said plurality of regional networks;

controlling a group of said regional controllers;

maintaining global route information of said SDN;

programming a flow table based on regional route information by use of a corresponding regional controller if said source node and said destination node are within a regional network;

receiving global route information sent from a corresponding root controller to said corresponding regional controller if said source node and said destination node are in different regional networks; and programming the flow table based on received global route information by use of said corresponding regional controller.

15. A non-transitory computer-readable storage medium of claim 14, wherein said corresponding regional controller is operable to determine multiple routes between said source node and said destination node for said data packet and perform resource management of said regional network.

16. A non-transitory computer-readable storage medium of claim 14, wherein said method further comprises maintaining a default flow table at a virtual network element, wherein said programming a flow table based on regional route information comprises modifying a default flow table based on regional route information, and forwarding said data packet based on modified flow table, wherein said one or more root controllers are configured to synchronize global route information with each other.

17. A non-transitory computer-readable storage medium of claim 14, wherein said corresponding regional controller comprises a hierarchy of controllers, wherein each superordinate level controller in said hierarchy is configured to control a respective number of subordinate level controllers in said hierarchy, wherein said method further comprises synchronizing route information from a superordinate level controller to a subordinate level controller.

18. A non-transitory computer-readable storage medium of claim 14, wherein said method further comprises communicating network performance information between regional controllers.

* * * * *